US010558298B2

(12) United States Patent
Ye et al.

(10) Patent No.: US 10,558,298 B2
(45) Date of Patent: Feb. 11, 2020

(54) TOUCH CONTROL SUBSTRATE, DRIVING METHOD THEREOF, DISPLAY PANEL AND DISPLAY DEVICE

(71) Applicants: BOE TECHNOLOGY GROUP CO., LTD., Beijing (CN); CHENGDU BOE OPTOELECTRONICS TECHNOLOGY CO., LTD., Chengdu, Sichuan (CN)

(72) Inventors: Benyin Ye, Beijing (CN); Zhidong Wang, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan (CN)

( * ) Notice: Subject to any disclaimer, the term of this patent is extended or adjusted under 35 U.S.C. 154(b) by 147 days.

(21) Appl. No.: 15/758,121

(22) PCT Filed: Sep. 28, 2017

(86) PCT No.: PCT/CN2017/103913
§ 371 (c)(1),
(2) Date: Mar. 7, 2018

(87) PCT Pub. No.: WO2018/161547
PCT Pub. Date: Sep. 13, 2018

(65) Prior Publication Data
US 2019/0361587 A1    Nov. 28, 2019

(51) Int. Cl.
*G06F 3/041* (2006.01)
*G06F 3/044* (2006.01)
*G06F 3/045* (2006.01)

(52) U.S. Cl.
CPC .......... *G06F 3/04166* (2019.05); *G06F 3/045* (2013.01); *G06F 3/0412* (2013.01); *G06F 3/0448* (2019.05); *G06F 2203/04106* (2013.01)

(58) Field of Classification Search
CPC ......... G06F 3/0412; G06F 2203/04106; G06F 3/045; G06F 3/04166; G06F 3/0448
See application file for complete search history.

(56) References Cited

U.S. PATENT DOCUMENTS 8,952,925 B2   2/2015   Bulea
10,162,450 B2  12/2018  Lu et al.
(Continued)

FOREIGN PATENT DOCUMENTS

CN    103927062 A    7/2014
CN    104330935 A    2/2015
(Continued)

OTHER PUBLICATIONS

International Search Report dated Nov. 13, 2017 issued in corresponding International Application No. PCT/CN2017/103913.
(Continued)

*Primary Examiner* — Muhammad N Edun
(74) *Attorney, Agent, or Firm* — Nath, Goldberg & Meyer; Joshua B. Goldberg

(57) ABSTRACT

A touch control substrate, a driving method thereof, a display panel and a display device are provided. The touch control substrate includes: a base substrate; a plurality of touch electrode blocks, disposed on the base substrate and arranged in an array; a resistance detection module, used for inputting a driving signal to the touch electrode blocks; a first control module, used for determining which touch electrode block is touched according to a time at which the touch electrode blocks in each row output the driving signal; a capacitance detection module, used for inputting a capacitance detection signal to sub-electrodes in each of two sub-rows of a row where the touched touch electrode block is located; and a second control module, used for determining a position of a touch point according to a capacitance feedback signal output by two sub-electrodes corresponding to the touched touch electrode block.

18 Claims, 2 Drawing Sheets

(56) References Cited

U.S. PATENT DOCUMENTS

| | | | |
|---|---|---|---|
| 2014/0118642 A1* | 5/2014 | Wang | G02F 1/13338 349/12 |
| 2016/0170530 A1 | 6/2016 | Lee | |
| 2016/0188029 A1* | 6/2016 | Liu | G02F 1/13338 345/174 |
| 2016/0253036 A1* | 9/2016 | Yang | G09G 3/20 345/174 |
| 2017/0108971 A1 | 4/2017 | Yang et al. | |

FOREIGN PATENT DOCUMENTS

| | | | |
|---|---|---|---|
| CN | 104503643 A | 4/2015 | |
| CN | 105278748 A | 1/2016 | |
| CN | 105653104 A | 6/2016 | |
| CN | 106339129 A | 1/2017 | |
| CN | 106909259 A | 6/2017 | |

OTHER PUBLICATIONS

Office Action dated Feb. 1, 2019 issued in corresponding Chinese Application No. 201710132391.6.

\* cited by examiner

TOUCH CONTROL SUBSTRATE, DRIVING METHOD THEREOF, DISPLAY PANEL AND DISPLAY DEVICE

CROSS-REFERENCE TO RELATED APPLICATIONS

This is a National Phase Application filed under 35 U.S.C. 371 as a national stage of PCT/CN2017/103913, filed Sep. 28, 2017, an application claiming the benefit of Chinese Patent Application No. 201710132391.6, filed on Mar. 7, 2017, the contents of which are incorporated herein by reference in its entirety.

TECHNICAL FIELD

The present disclosure belongs to the field of display technology, and in particular relates to a touch control substrate, a method for manufacturing the touch control substrate, a display panel and a display device.

BACKGROUND

Touch screens have become the dominant human-computer interaction means of personal mobile communication devices and integrated information terminals such as tablets, smartphones, and super laptops, due to their advantages such as ease of use, intuitiveness and flexibility. Touch screens can be divided into four main types of resistive touch screens, capacitive touch screens, infrared touch screens and surface wave (SAW) touch screens according to a touch control principle. Among them, the capacitive touch screens have now become the main application of touch interaction of small or medium size information terminals, because the capacitive touch screens have multi-touch function, short reaction time, long service life, high transmittance and superior user experience, and as the processes gradually become mature, yield rate has been significantly improved, making the price of capacitive screens lower and lower.

SUMMARY

The present disclosure intends to at least solve one of the technical problems existing in the prior art and provides a touch control substrate, a driving method thereof, a display panel and a display device.

In a first aspect of the disclosure, a touch control substrate is provided, which includes:
 a base substrate;
 a plurality of touch electrode blocks, disposed on the base substrate and arranged in an array, each of the plurality of touch electrode blocks including two sub-electrodes, each row of touch electrode blocks including two sub-rows of sub-electrodes, and sub-electrodes in a same sub-row are connected together;
 a resistance detection module, used for inputting a driving signal row by row to the touch electrode blocks;
 a first control module, used for determining which touch electrode block is touched according to a time at which the touch electrode blocks in each row output the driving signal;
 a capacitance detection module, used for inputting a capacitance detection signal one by one to sub-electrodes in each of two sub-rows of a row where the touched touch electrode block is located; and
 a second control module, used for determining a position of a touch point according to a capacitance feedback signal output by two sub-electrodes corresponding to the touched touch electrode block.

Optionally, each sub-electrode has a triangular shape.
 Optionally, each of the plurality of touch electrode blocks is used as a common electrode in a display phase.
 Optionally, the touch control substrate includes a plurality of pixel units arranged in an array, and the plurality of pixel units are disposed correspondingly to the plurality of touch electrode blocks.
 Optionally, each of the touch electrode blocks corresponds to a respective one of the plurality of pixel units.
 Optionally, each of the touch electrode blocks corresponds to plural pixel units arranged in an array.
 Optionally, a material of each sub-electrode is indium tin oxide (ITO).
 Optionally, the first control module and the second control module are integrated together.
 In a second aspect of the disclosure, there is provided a driving method of the above touch control substrate, the driving method includes:
 inputting a driving signal to the touch electrode blocks row by row, and determining which touch electrode block is touched according to a time at which the touch electrode blocks in each row output the driving signal; and
 inputting a capacitance detection signal to the sub-electrodes in each sub-row in a row where the touched touch electrode block is located one by one, and determining a position of a touch point according to a capacitance feedback signal output by two sub-electrodes corresponding to the touched touch electrode block.
 Optionally, the driving signal is an excitation signal.
 In a third aspect of the disclosure, a display panel including the above touch control substrate is provided.
 In a fourth aspect of the disclosure, a display device including the above display panel is provided.

DETAILED DESCRIPTION

In order to make those skilled in the art understand the technical solutions of the present disclosure better, embodiments of the present disclosure are further described in detail below with reference to the accompanying drawings and specific embodiments.

The touch screens in the prior art mainly include the following two types: mutual capacitance touch screens and self-capacitance touch screens. A mutual capacitance touch screen generates a capacitance at an intersection where a horizontal electrode and a vertical electrode intersects each other; and when a finger touches the screen, a touch point is detected by detecting a change in a capacitance value of the capacitance. For a self-capacitance touch screen, a touch point is detected by detecting a change in a capacitance value of a capacitance of an electrode relative to the ground. However, for a mutual capacitance touch structure, horizontal and vertical electrodes need to be fabricated, and three MASK (patterning) processes are needed, therefore the process is complicated and the manufacturing cost is high. For a self-capacitance touch structure, although only one MASK process is needed, electrode leads increase, the difficulty of wiring increases, and the number of corresponding pins increases. As a result, the size of a bonded flexible printed circuit board (FPC) is too large, which increases the material cost and the production difficulty.

Figure 1:
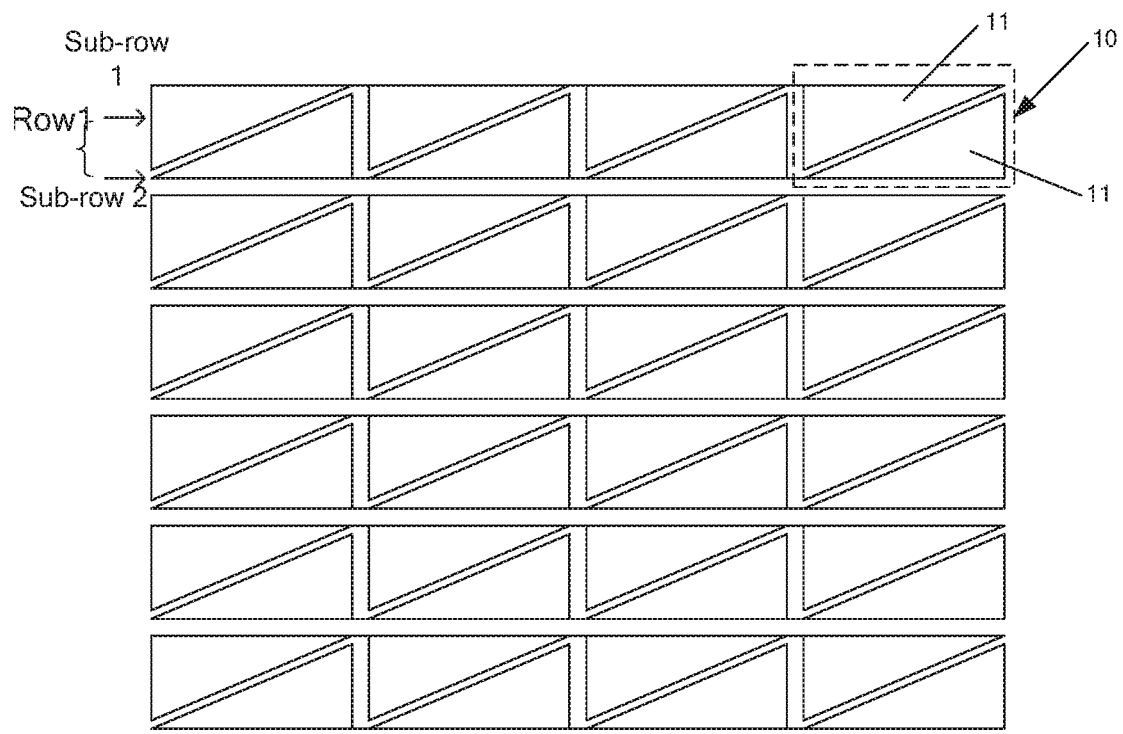
FIG. 1 is a schematic structural diagram of a touch control substrate provided in an embodiment of the present disclosure.

As shown in FIG. 1, an embodiment of the present disclosure provides a touch control substrate, which includes a base substrate; a plurality of touch electrode blocks 10 disposed on the base substrate and arranged in an array, each touch electrode block 10 including two sub-electrodes 11, each row of touch electrode blocks include two sub-rows of sub-electrodes, and the sub-electrodes 11 in a same sub-row are connected together; a resistance detection module, used for inputting a driving signal row by row to the touch electrode blocks 10; a first control module, used for determining that which touch electrode block 10 is touched according to a time when the touch electrode blocks 10 in each row output a driving signal; a capacitance detection module, used for inputting a capacitance detection signal one by one to the sub-electrodes 11 in each of two sub-rows of a row where the touched touch electrode block 10 is located; and a second control module, used for determining a position of a touch point according to a capacitance feedback signal output by two sub-electrodes 11 corresponding to the touched touch electrode block 10.

Figure 2:
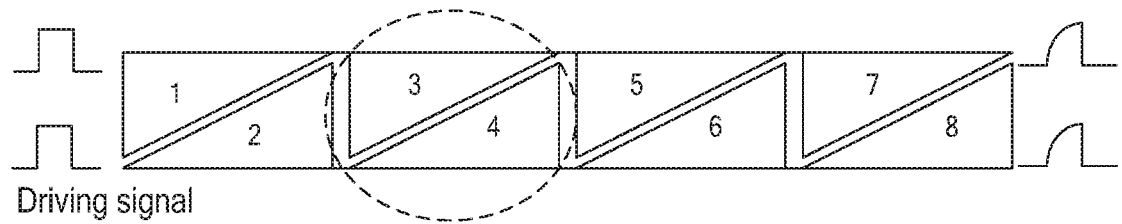
FIG. 2 is a schematic diagram illustrating a process of inputting a driving signal to each row of touch electrode blocks according to an embodiment of the present disclosure.
Figure 3:
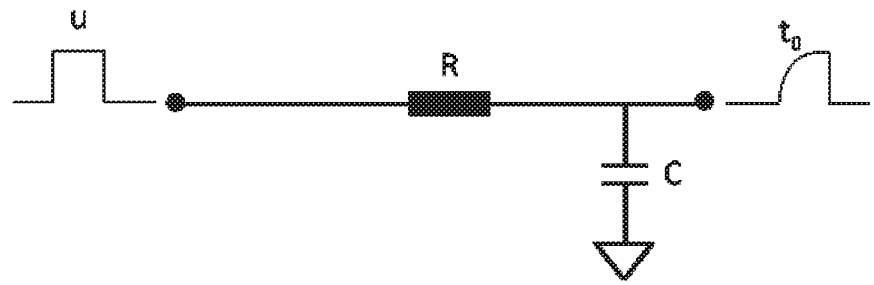
FIG. 3 is an equivalent circuit diagram of a sub-electrode of a touch control substrate when no finger touch occurs according to an embodiment of the present disclosure.
Figure 4:
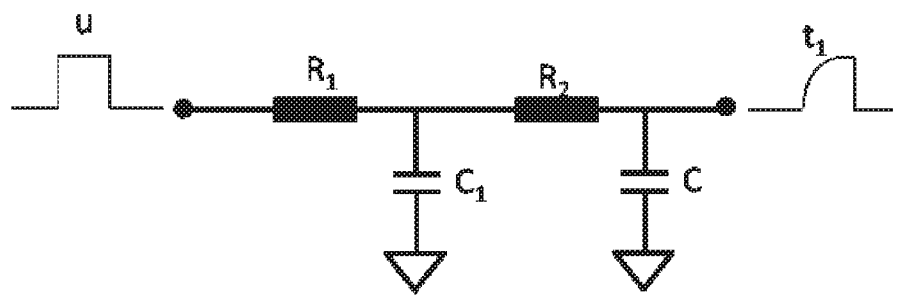
FIG. 4 is an equivalent circuit diagram of a sub-electrode of a touch control substrate when a finger touch occurs according to an embodiment of the present disclosure.
Figure 5:
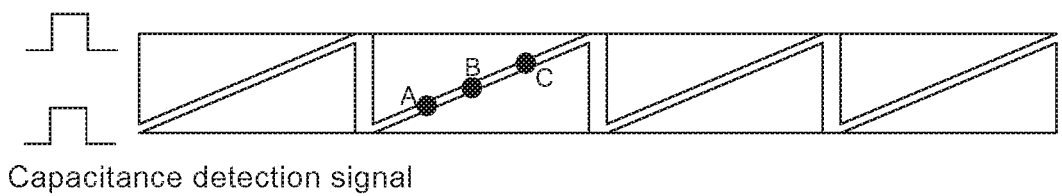
FIG. 5 is a schematic diagram illustrating a process of inputting a capacitance detection signal to each sub-row of sub-electrodes according to an embodiment of the present disclosure.

In this embodiment, a touch control layer in the touch control substrate is formed by arranging a single layer of touch electrode blocks 10 in an array. Each touch electrode block 10 is composed of two sub-electrodes 11. Each row of touch electrode blocks 10 is composed of two sub-rows of sub-electrodes 11 (that is, row 1 shown in FIG. 1 includes sub-rows 1 and 2), and the sub-electrodes 11 located in the same sub-row are connected together. As shown in FIG. 2, when performing touch point detection, first, the resistance detection module inputs a driving signal row by row to an input terminal of the touch electrode blocks 10, and the driving signal may be an excitation signal u, that is, the resistance detection module simultaneously inputs the driving signal to the two sub-rows of sub-electrodes 11 included in each row of touch electrode blocks 10. If there is no finger touch, as shown in FIG. 3, a sub-electrode 11 can be equivalent to a resistor R and a grounded capacitor C. Because of a RC delay, for each row of the touch electrode blocks 10, an output terminal of the row of touch electrode blocks 10 may receive the driving signal input from an input terminal thereof after a time $t_0$. If there is a finger touch, as shown in FIG. 4, at a position touched by the finger, the sub-electrode 11 is divided into two resistors R1 and R2, a finger-to-ground capacitor C1 and a grounded capacitor C. At this time, the delay corresponding to a time when the driving signal is output changes compared to the case of no finger touch. That is, the output terminal of the row of touch electrode blocks 10 may receive the driving signal input from the input terminal thereof after a time $t_1$. Therefore, the y-coordinate of the position of the finger touch is determined according to a row whose RC delay time changes. In addition, when the finger moves on a same sub-row of sub-electrodes 11, different RC delays are generated according to values of two divided resistors R1 and R2. The x-coordinate of the position of the finger touch can be determined according to the RC delay. Thus, a position of a touched touch electrode block 10 (ie, a large area touched by a finger, for example, an area defined by a dotted circle in FIG. 2) can be obtained. Thereafter, as shown in FIG. 5, the capacitance detection module inputs the capacitance detection signal (self-capacitance detection signal) one by one to the sub-electrodes 11 in each of two sub-rows corresponding to the touched touch electrode block is located; and the second control module determines the accurate position of the touch point (that is, which one of points A, B and C is touched in FIG. 5) according to the capacitance feedback signal output by two sub-electrodes 11 corresponding to the touched touch electrode block. The touch control substrate provided in this embodiment can detect a more accurate position of the touch point.

A shape of each sub-electrode 11 is a triangle. Of course, each sub-electrode 11 may be of other shape as long as two sub-electrodes 11 in each touch electrode block 10 can be assembled into an electrode block. Optionally, a material of the sub-electrode 11 is indium tin oxide (ITO), and other transparent conductive materials may also be used.

The touch control substrate in this embodiment further includes a plurality of pixel units arranged in an array, and the pixel units are disposed correspondingly to the touch electrode blocks 10. Specifically, one touch electrode block 10 may correspond to one pixel unit, or one touch electrode block 10 may correspond to a plurality of pixel units arranged in an array. For example, one touch electrode block 10 corresponds to 2×2 pixel units.

In this embodiment, each touch electrode block 10 in the touch control substrate is used as a common electrode in a display phase. That is, the touch electrode block 10 may be used in a time-division manner. The touch electrode block 10 may be used as a touch electrode in a touch control phase, and used as the common electrode in the display phase.

In this embodiment, the first control module and the second control module in the touch control substrate are integrated together, that is, the two control modules are integrated in a same control chip.

Therefore, according to the touch control substrate of the present embodiment, the approximate touch position is first determined through a resistance detection, and then the accurate touch point is determined through a capacitance detection. In addition, the touch control substrate in this embodiment has a simpler wiring than the self-capacitance touch control substrate, and has one less layer than the mutual capacitance touch control substrate, and thus is relatively thin and light.

As shown in FIGS. 2-5, another embodiment of the present disclosure provides a driving method of a touch control substrate, the touch control substrate is the touch control substrate in the above embodiment. The driving method includes the following steps.

First, a driving signal is input to the touch electrode blocks 10 row by row, and the fact that which touch electrode block 10 is touched is determined according to a time at which the touch electrode blocks 10 in each row output the driving signal.

Specifically, the resistance detection module inputs a driving signal row by row to an input terminal of the touch electrode blocks 10, and the driving signal may be an excitation signal u, that is, the resistance detection module simultaneously inputs the driving signal to the two sub-rows of sub-electrodes 11 included in one row of touch electrode blocks 10. If there is no finger touch, a sub-electrode 11 may be equivalent to a resistor R and a grounded capacitor C. Because of a RC delay, for each row of the touch electrode blocks 10, an output terminal of the row of touch electrode blocks 10 may receive the driving signal input from an input terminal thereof after a time $t_0$. If there is a finger touch, at a position touched by the finger, the sub-electrode 11 is divided into two resistors R1 and R2, a finger-to-ground capacitor C1 and a grounded capacitor C. At this time, the delay corresponding to a time when the driving signal is output changes compared to the case of no finger touch. That is, the output terminal of the row of touch electrode blocks 10 may receive the driving signal input from the input terminal thereof after a time $t_1$. Therefore, the y-coordinate of the position of the finger touch is determined according to a row whose RC delay time changes. In addition, when the finger moves on a same sub-row of sub-electrodes 11, different RC delays are generated according to values of two divided resistors R1 and R2. The x-coordinate of the position of the finger touch can be determined according to the RC delay. Thus, a position of a touched touch electrode block 10 (i.e., a large area touched by a finger) can be obtained.

Afterwards, a capacitance detection signal is input one by one to the sub-electrodes 11 in each of two sub-rows of a row where the touched touch electrode block 10 is located; and a position of a touch point is determined according to a capacitance feedback signal output by two sub-electrodes 11 corresponding to the touched touch electrode block 10.

Specifically, the capacitance detection module inputs the capacitance detection signal (self-capacitance detection signal) one by one into the sub-electrodes 11 in each of two sub-rows of a row where the touched touch electrode block 10 is located; and the second control module can determine the accurate position of the touch point (that is, which one of points A, B and C is touched in FIG. 5) according to the capacitance feedback signal output by two sub-electrodes 11 corresponding to the touched touch electrode block 10.

According to the driving method of the touch control substrate of the present embodiment, the approximate touch position is first determined through a resistance detection, and then the accurate touch point is determined through a capacitance detection, thereby detecting a more accurate position of the touch point.

A further embodiment of the present disclosure provides a display panel and a display device. The display panel includes the touch control substrate of the above embodiments, and the display device includes the display panel.

The display device may be a liquid crystal display device, such as a liquid crystal panel, an electronic paper, a cell phone, a tablet computer, a television, a display, a notebook computer, a digital photo frame, a navigator, or any other product or component having a display function.

The display device in this embodiment has high sensitivity.

It should be understood that the above embodiments are merely exemplary embodiments for the purpose of illustrating the principles of the present disclosure, but the present disclosure is not limited thereto. It will be apparent to those skilled in the art that various changes and modifications can be made without departing from the spirit and essence of the present disclosure, which are also to be regarded as the scope of the present disclosure.

What is claimed is:

1. A touch control substrate, comprising:
   a base substrate;
   a plurality of touch electrode blocks, disposed on the base substrate and arranged in an array, each of the plurality of touch electrode blocks comprising two sub-electrodes, each row of touch electrode blocks comprising two sub-rows of sub-electrodes, and sub-electrodes in a same sub-row are connected together;
   a resistance detection module, configured to input a driving signal to the touch electrode blocks row by row;
   a first control module, configured to determine which touch electrode block is touched according to a time at which the touch electrode blocks in each row output the driving signal;
   a capacitance detection module, configured to input a capacitance detection signal one by one to sub-electrodes in each of two sub-rows of a row where the touched touch electrode block is located; and
   a second control module, configured to determine a position of a touch point according to a capacitance feedback signal output by two sub-electrodes corresponding to the touched touch electrode block.

2. The touch control substrate of claim 1, wherein each sub-electrode has a triangular shape.

3. The touch control substrate of claim 1, wherein each of the plurality of touch electrode blocks is used as a common electrode in a display phase.

4. The touch control substrate of claim 1, wherein the touch control substrate comprises a plurality of pixel units arranged in an array, and the plurality of pixel units are disposed correspondingly to the plurality of touch electrode blocks.

5. The touch control substrate of claim 4, wherein each of the touch electrode blocks corresponds to a respective one of the plurality of pixel units.

6. The touch control substrate of claim 4, wherein each of the touch electrode blocks corresponds to plural pixel units arranged in an array.

7. The touch control substrate of claim 1, wherein a material of each sub-electrode is indium tin oxide (ITO).

8. The touch control substrate of claim 1, wherein the first control module and the second control module are integrated together.

9. A driving method of a touch control substrate, the touch control substrate being the touch control substrate of claim 1, the driving method comprising:
   inputting a driving signal to the touch electrode blocks row by row, and determining which touch electrode block is touched according to a time at which the touch electrode blocks in each row output the driving signal; and
   inputting a capacitance detection signal to the sub-electrodes in each of two sub-rows in a row where the touched touch electrode block is located one by one, and determining a position of a touch point according to a capacitance feedback signal output by two sub-electrodes corresponding to the touched touch electrode block.

10. The driving method of claim 9, wherein the driving signal is an excitation signal.

11. The driving method of claim 9, wherein each of the plurality of touch electrode blocks is used as a common electrode in a display phase.

12. The driving method of claim 9, wherein the touch control substrate comprises a plurality of pixel units arranged in an array, and the plurality of pixel units are disposed correspondingly to the plurality of touch electrode blocks.

13. The driving method of claim 12, wherein each of the touch electrode blocks corresponds to a respective one of the plurality of pixel units.

14. The driving method of claim 12, wherein each of the touch electrode blocks corresponds to plural pixel units arranged in an array.

15. A display panel, comprising the touch control substrate of claim 1.

16. A display device, comprising the display panel of claim 15.

17. The display device of claim 16, wherein each of the plurality of touch electrode blocks is used as a common electrode in a display phase.

18. The display panel of claim 15, wherein each of the plurality of touch electrode blocks is used as a common electrode in a display phase.

\* \* \* \* \*